(12) United States Patent
Xie et al.

(10) Patent No.: US 12,548,334 B2
(45) Date of Patent: Feb. 10, 2026

(54) VIDEO PROCESSING

(71) Applicant: SHANGHAI HODE INFORMATION TECHNOLOGY CO., LTD., Shanghai (CN)

(72) Inventors: Chang Xie, Shanghai (CN); Peiyi Li, Shanghai (CN)

(73) Assignee: SHANGHAI HODE INFORMATION TECHNOLOGY CO., LTD., Shanghai (CN)

( * ) Notice: Subject to any disclaimer, the term of this patent is extended or adjusted under 35 U.S.C. 154(b) by 424 days.

(21) Appl. No.: 18/298,243

(22) Filed: Apr. 10, 2023

(65) Prior Publication Data

US 2023/0245455 A1 Aug. 3, 2023

Related U.S. Application Data

(63) Continuation of application No. PCT/CN2021/120390, filed on Sep. 24, 2021.

(30) Foreign Application Priority Data

Dec. 22, 2020 (CN) .......................... 202011529552.3

(51) Int. Cl.
*G06V 20/40* (2022.01)
*G06F 16/735* (2019.01)
(Continued)

(52) U.S. Cl.
CPC ............ *G06V 20/46* (2022.01); *G06F 16/735* (2019.01); *G06F 16/738* (2019.01);
(Continued)

(58) Field of Classification Search
CPC ...... G06V 20/46; G06V 20/635; G06V 30/10; G06V 20/41; G06F 16/735; G06F 16/738;
(Continued)

(56) References Cited

U.S. PATENT DOCUMENTS

| 10,146,751 B1 | 12/2018 | Zhang |
| 2010/0332475 A1 | 12/2010 | Birdwell et al. |

(Continued)

FOREIGN PATENT DOCUMENTS

| CN | 103902611 A | 7/2014 |
| CN | 106878632 A | 6/2017 |

(Continued)

OTHER PUBLICATIONS

EESR issued in the counterpart EP application No. 21908702.0, Official mailing date: Jan. 22, 2024, 8 pages.

(Continued)

*Primary Examiner* — Jennifer Mehmood
*Assistant Examiner* — Dustin Bilodeau
(74) *Attorney, Agent, or Firm* — FisherBroyles, LLP

(57) ABSTRACT

A video processing method and apparatus is provided. The video processing method includes: extracting at least two types of modal information from a received target video; extracting text information from the at least two types of modal information based on extraction manners corresponding to the at least two types of modal information; and performing matching between preset object information of a target object and the text information to determine an object list corresponding to the target object included in the target video.

17 Claims, 5 Drawing Sheets

(51) Int. Cl.
*G06F 16/738* (2019.01)
*G06V 20/62* (2022.01)
*G06V 30/10* (2022.01)
*G10L 15/08* (2006.01)

(52) U.S. Cl.
CPC ............ *G06V 20/635* (2022.01); *G06V 30/10* (2022.01); *G10L 15/08* (2013.01)

(58) Field of Classification Search
CPC ... G06F 16/7844; G06F 16/739; G10L 15/08; G10L 15/18; H04N 21/26603; H04N 21/233; H04N 21/23418; H04N 21/234336; H04N 21/234; H04N 21/235; H04N 21/47815
USPC .......................................................... 382/100
See application file for complete search history.

(56) References Cited

U.S. PATENT DOCUMENTS

| | | | |
|---|---|---|---|
| 2012/0127276 | A1 | 5/2012 | Tsai et al. |
| 2014/0068654 | A1 | 3/2014 | Marlow et al. |
| 2016/0125096 | A1 | 5/2016 | Haverlock et al. |
| 2019/0080207 | A1* | 3/2019 | Chang ................ G06F 16/7837 |
| 2020/0233898 | A1 | 7/2020 | Barzelay et al. |

FOREIGN PATENT DOCUMENTS

| | | | | |
|---|---|---|---|---|
| CN | 107180055 | A * | 9/2017 | ......... G06Q 30/0269 |
| CN | 108833973 | A | 11/2018 | |
| CN | 109359636 | A | 2/2019 | |
| CN | 109905772 | A | 6/2019 | |
| CN | 110147467 | A | 8/2019 | |
| CN | 110225387 | A | 9/2019 | |
| CN | 110502661 | A | 11/2019 | |
| CN | 110582025 | A | 12/2019 | |
| CN | 110795597 | A * | 2/2020 | |
| CN | 111241340 | A | 6/2020 | |
| CN | 112738556 | A | 4/2021 | |
| IN | 107180055 | A | 9/2017 | |

OTHER PUBLICATIONS

Intl. Search Report and Written Opinion issued in related case, PCT Application No. PCT/CN2021/120390 mailed Nov. 24, 2021, 10 pages.
Notification of Grant issued in related case, CN Application No. 202011529552.3, mailed Dec. 21, 2022, 4 pages.
Office Action issued in related case, CN Appl. No. 202011529552.3, mailed Mar. 28, 2022, 12 pages.

* cited by examiner

VIDEO PROCESSING

CROSS-REFERENCE TO RELATED APPLICATIONS

This application is a continuation under 35 U.S.C. 111(a) of PCT International Application No. PCT/CN2021/120390, filed on Sep. 24, 2021, which claims priority to Chinese Patent Application No. 202011529552.3, filed on Dec. 22, 2020, the entire contents of which are hereby incorporated by reference in their entirety for all purposes.

TECHNICAL FIELD

This application relates to computer technologies, and in particular to video processing.

BACKGROUND

With the development of Internet technologies, the gradual improvement of the Internet infrastructure, and the continuous innovation of mobile devices, the world is already in the mobile Internet era. As one important carrier of transferring information on a mobile side, a video becomes an indispensable part of people's daily life, learning, working, and entertainment. The video carries a large amount of multifarious information. It is nearly impossible for a transfer manner such as a picture, text, and audio to catch up.

Generally, video information has a large information capacity. Among information that can be processed by a person at the same time, the video carries a largest amount of information. In addition, the video information has a plurality of modals, that is, the video information naturally has a plurality of dimensions. The video information includes image information of each frame and text information carried in a subtitle, and also includes audio information carried in an audio track and the like. In addition, the video information has temporal association, that is, information carried in each frame or segment in the video information is generally related to a previous segment or a next segment of video content. In the video, each frame carries information, and deeper and more complex information is also carried through context association.

SUMMARY

According to some embodiments of this application, a method is provided, including:

extracting at least two types of modal information from a received target video;

extracting text information from the at least two types of modal information based on extraction manners corresponding to the at least two types of modal information; and performing matching between preset object information of a target object and the text information to determine an object list corresponding to the target object included in the target video.

According to some embodiments of this application, a computing device is provided, including a memory, a processor, and computer instructions stored in the memory and capable of running on the processor, where when executing the instructions, the processor perform operations of the above method.

According to some embodiments of this application, a non-transitory computer-readable storage medium is provided, the non-transitory computer-readable storage medium has computer program instructions stored thereon, wherein the computer program instructions, when executed by a processor, cause the processor to perform operations of the above method.

DETAILED DESCRIPTION OF THE EMBODIMENTS

Figure 1:
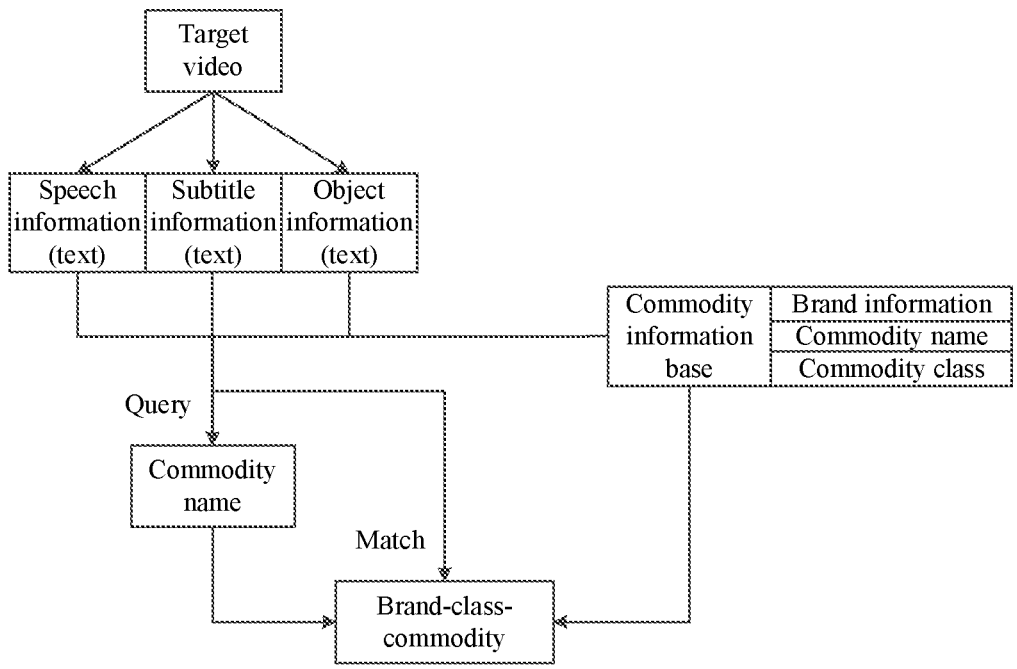
FIG. 1 is an example diagram of an application scenario of a video processing method according to an embodiment of this application.

Many specific details are described in the following descriptions to facilitate full understanding of this application. However, this application can be implemented in many other manners different from those described herein. A person skilled in the art may make similar promotion without departing from the connotation of this application. Therefore, this application is not limited to the specific implementations disclosed below.

Terms used in one or more embodiments of this application are merely used to describe specific embodiments, but are not intended to limit the one or more embodiments of this application. The terms "a", "said", and "the" of singular forms used in one or more embodiments and the appended claims of this application are also intended to include plural forms, unless otherwise specified in the context clearly. It should also be understood that, the term "and/or" used in one or more embodiments of this application indicates and includes any or all possible combinations of one or more associated listed items.

It should be understood that, although terms such as "first" and "second" may be used in one or more embodiments of this application to describe various types of information, the information is not limited to these terms. These terms are only used to differentiate between information of the same type. For example, without departing from the scope of one or more embodiments of this application, "first" may also be referred to as "second", and similarly, "second" may also be referred to as "first". Depending on the context, for example, the word "if" used herein can be explained as "while", "when", or "determining in response to".

First, nouns related to one or more embodiments of this application are explained.

Optical character recognition (OCR) is a process in which an electronic device (such as a scanner or a digital camera) checks a character printed on paper, determines a shape of the character by detecting darkness and lightness, and then translates the shape into computer text by using a character recognition method.

Object detection is to find all objects of interest in an image, including two subtasks: object positioning and object classification, and to determine a class and a location of the object.

Natural language processing (NLP) is an important direction in the field of computer science and the field of artificial intelligence, and studies various theories and methods that can implement effective communication between a person and a computer in natural language.

Automatic speech recognition (ASR) is a process of automatically converting speech of a person into text, and an automatic speech recognition technology is a technology of converting speech of a person into text.

A language model is abstract mathematical modeling of language based on an objective fact of the language, and is a correspondence. A relationship between the language model and the objective fact of the language is similar to a relationship between an abstract straight line and a specific straight line in mathematics.

Word embedding is a method for converting a word in text into a digit vector. To analyze the word by using a standard machine learning algorithm, the digit vector into which the word is converted needs to be input in a digit form.

Multi-modal: Each information source or form may be referred to as a modal. For example, a person has the sense of touching, hearing, seeing, and smelling. An information medium includes speech, a video, and text. There are various sensors such as a radar, an infrared sensor, and an accelerometer. Each of the foregoing manners may be referred to as a modal. Multi-modal is a capability to process and understand multi-modal information by a specific method.

A feature originally means a characteristic of something different from another, and in this application and a document in the same field, the feature is an abstract characteristic that can represent a type of information.

Disfluency detection means automatically deleting a disfluent word in an automatic speech recognition (ASR) result by using an algorithm, to obtain a more natural and fluent sentence.

You look only once (YOLO) is a one-stage object detection network structure, and is used for object detection.

Faster region-based convolutional neural network (Faster-RCNN) is a two-stage object detection network structure, and is used for object detection.

A single shot multibox detector (SSD) is a one-stage object detection network structure, and is used for object detection.

Bidirectional encoder representation from transformers (BERT) is a model for natural language processing, performs fine tuning by using an additional output layer, and is applicable to state-of-the-art modeling for a wide range of tasks, for example, a question answering task and language inference.

A text-attentional convolutional neural network (Text-CNN) is an algorithm that classifies text by using a convolutional neural network. A convolution neural network (CNN) is a type of feedforward neural network that includes convolution calculation and has a deep structure.

For a viewer of a video, the video information of the video needs to be received as much as possible. However, for hundreds of millions of massive video information, not all people are interested in information included in each frame. In tasks such as video retrieval, summarization, video recommendation, and reviewing, only a part of interest in the video information needs to be extracted. How to extract effective information from a video to complete such tasks becomes a problem that needs to be resolved urgently.

To resolve a defect in the related art that information missing or an error occurs when effective information is extracted from a video, this application provides a video processing method. This application also relates to a video processing apparatus, a computing device, a computer-readable storage medium, and a computer program product. The video processing method, the video processing apparatus, the computing device, the computer-readable storage medium, and the computer program product are described in detail in the following embodiments one by one.

FIG. 1 is an example diagram of an application scenario of a video processing method according to an embodiment of this application.

In the application scenario in FIG. 1, a server receives a commodity video (namely, a target video), and extracts multi-modal information from the commodity video. The commodity video may be understood as an introduction video of a commodity, a livestreaming commodity video, and the like. The extracted multi-modal information includes speech information, subtitle information, image information, and the like, and text information corresponding to the speech information, text information corresponding to the subtitle information, and text information corresponding to the image information are extracted from the extracted multi-modal information.

On the basis of extracting the text information, a commodity name included in a commodity information base is queried from the text information corresponding to the speech information, the text information corresponding to the subtitle information, and/or the text information corresponding to the image information, to determine a commodity name (which is a specific article name such as sneakers or shampoo) included in each type of text information. In addition, a search range corresponding to the commodity name is searched for brand information (which is a commodity trademark) that matches the commodity name, and matching is further performed between commodity information in the commodity information base and each of the commodity name and the brand information corresponding to the commodity name, to determine a commodity class (namely, a commodity category: a commodity class shown by a commodity, for example, a juicer belongs to a kitchen appliance, and the kitchen appliance belongs to a household appliance) corresponding to the commodity name and the brand information. Therefore, a brand-category-commodity list corresponding to a commodity included in the commodity video is obtained, to perform task processing such as searching, recommendation, video summarization, and reviewing on the commodity video based on the commodity list corresponding to the commodity.

In the video processing method provided in the embodiments of this application, multi-modal information in a commodity video is analyzed, to determine a commodity list corresponding to a commodity included in the commodity video. Therefore, the commodity video is processed, information of interest in the commodity video is extracted, commodity information of the commodity in the commodity video is prevented from being extracted by using single-feature video information, and accuracy of extracting the commodity information is improved.

Figure 2:
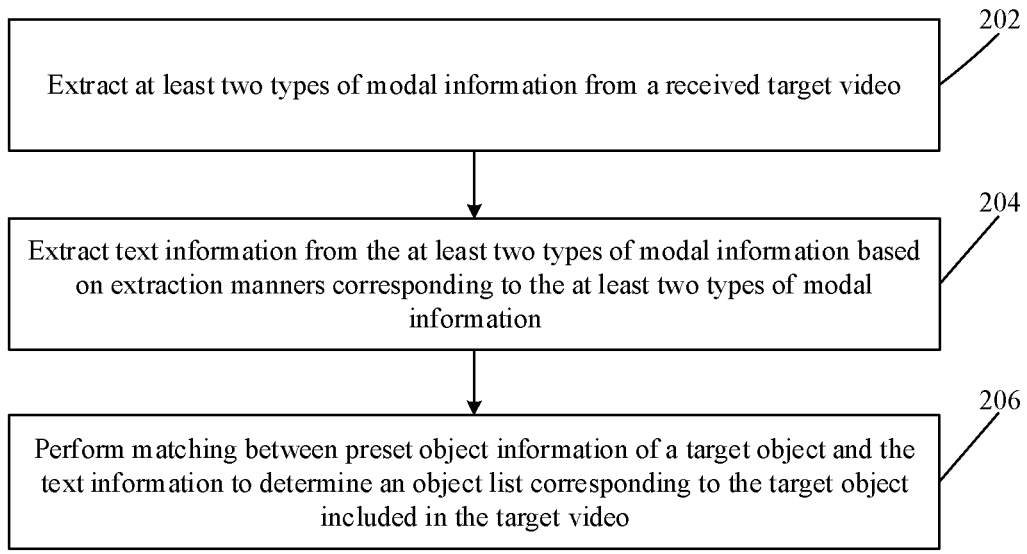
FIG. 2 is a flowchart of a video processing method according to an embodiment of this application.

FIG. 2 is a flowchart of a video processing method according to an embodiment of this application. The method includes the following steps.

Step 202: Extract at least two types of modal information from a received target video.

The target video includes but is not limited to a livestreaming video, a commodity video, a television video, a movie video, an animated video, an entertainment video, and the like. This is not limited herein. For the modal information, each information source or form is referred to as a modal. For example, a person has the sense of touching, hearing, seeing, and smelling. An information medium includes speech, a video, and text. There are various sensors such as a radar, an infrared sensor, and an accelerometer. Each of the foregoing manners may be referred to as a modal, and information obtained by using the foregoing modal is modal information.

In actual application, a deviation may exist when video information is understood by using a single feature, and consequently recommendation of video content (for example, a commodity) is missed or inaccurate.

In an implementation, modal information is diverse, and correspondingly, obtaining manners of obtaining different modal information are also diverse. A plurality of pieces of modal information in a video are obtained, to help more comprehensively understand information transferred in the target video. In some embodiments, the extracting at least two types of modal information from a received target video is implemented in the following manner:

extracting speech information from the received target video;

extracting image information from the target video based on a preset extraction rule; and/or extracting image information from the target video based on a preset extraction rule, and extracting subtitle information included in the image information.

The extracting speech information from the received target video may be understood as separating an audio track from the target video to obtain the speech information included in the audio track. Audio tracks are parallel "tracks" seen in audio sequencer software. Each audio track defines an attribute of the audio track, for example, timbre of the audio track, a timbre library, a channel quantity, an input/output port, and a volume.

The image information may be understood as an image frame. The preset extraction rule is an extraction rule for extracting an image frame from all image frames included in the target video, for example, extracting one image frame at an interval of five frames, or extracting one image frame at an interval of two frames. This is not limited herein. Therefore, an image sequence, namely, the image information, including the extracted image frame is obtained.

In addition, the target video may further include the subtitle information, and the subtitle may also reflect some video features. Text recognition may be performed on the extracted image frame, to recognize text information (namely, the subtitle information) included in the image frame.

Step 204: Extract text information from the at least two types of modal information based on extraction manners corresponding to the at least two types of modal information.

In actual application, a manner of extracting text information from the modal information varies with the modal information. There are many related technologies such as an object detection technology/speech recognition/three-dimensional convolution/abnormality detection/text recognition/object tracking. These technologies play a great role in discovering and understanding information in a video, and can replace a human being in many tasks to obtain key information that exists in the video and assist in determining.

On the basis of extracting a plurality of types of modal information, corresponding text information is further extracted from each type of modal information, to unify the information included in the video in a form of text, so as to improve comparability between a plurality of pieces of modal information. Optionally, the extracting text information from the at least two types of modal information based on extraction manners corresponding to the at least two types of modal information includes:

extracting corresponding first text information from the speech information based on an extraction manner corresponding to the speech information;

extracting corresponding second text information from the image information based on an extraction manner corresponding to the image information; and/or performing text processing on the subtitle information to generate third text information corresponding to the subtitle information, where the first text information, the second text information, and/or the third text information form/forms the text information.

The extraction manner corresponding to the speech information may be understood as speech recognition, that is, a manner of converting the speech information into text information. The extraction manner corresponding to the image information may be understood as performing object detection on the target object in the image frame, to obtain object information of the target object. The subtitle information may include reward information, misspellings, and the like. Therefore, text processing may be performed to remove ineffective information in the subtitle information. Further, the first text information extracted from the speech information, the second text information extracted from the image information, and/or the third text information extracted from the subtitle information may be combined based on a time sequence to form the text information.

In some embodiments, on the basis of performing speech recognition on the speech information, a speech recognition result is further adjusted by using a first text processing model and a second text processing model, to improve accuracy of the text information. The extracting corresponding first text information from the speech information based on an extraction manner corresponding to the speech information includes:

performing speech recognition by inputting the speech information into a speech recognition model, to obtain initial text information included in the speech information; and adjusting the initial text information based on a disfluency detection model and a text correction model, to obtain the first text information corresponding to the speech information.

The speech recognition model may be an ASR model. Performing speech recognition by using the ASR model may be understood as performing encoding and feature extraction by inputting the speech information into the speech recognition model, inputting an extracted feature into an acoustic model library for query, to obtain a single word or Chinese character, and then inputting the single word or Chinese character into a language model library for query, to obtain a word or Chinese character with a highest matching degree, so as to form the initial text information.

However, because the initial text information may include a disfluent sentence, a pet phrase, or the like, disfluency detection and text correction need to be performed on the initial text information. In some embodiments, the disfluency detection model is used to perform disfluency detection on the initial text information, that is, delete a disfluent word in an automatic speech recognition (ASR) result, to obtain a more natural and fluent sentence. The text correction model may be a natural language processing (NLP) model, is used to perform text correction on the initial text information/text information obtained after disfluency detection. For example, the initial text information obtained through speech recognition is "我今天去了一家宾馆 问前台务员水饺多少钱一碗 (Chinese characters, which mean "I went to a hotel today and asked the receptionist how much it cost to have a bowl of dumplings"). The sentence is grammatically fluent but is semantically puzzling. A reason is that the hotel generally does not sell dumplings. With the natural language processing model, the sentence is corrected as "我今天去了一家宾馆 问前台服务员睡觉多少钱一晚 (Chinese characters, which mean "I went to a hotel today and asked the receptionist how much it cost to sleep for one night").

Figure 3:
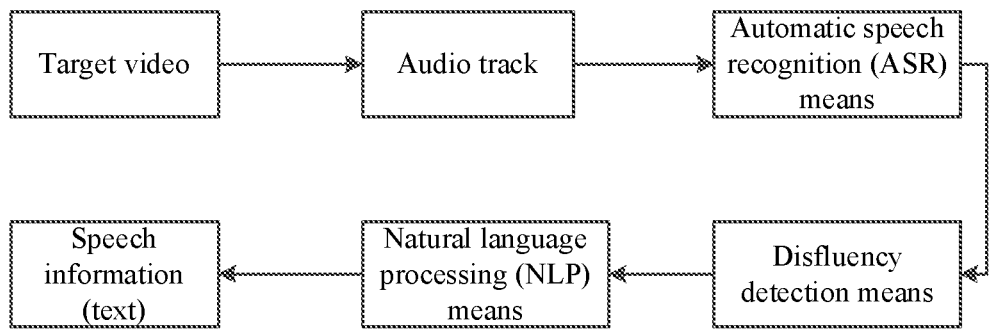
FIG. 3 is a flowchart of extracting text information corresponding to speech information included in a video according to an embodiment of this application.

For example, as shown in FIG. 3, the server receives a video (namely, the target video); separates an audio track in the video; inputs, into a speech recognition means (ASR) for speech recognition, speech information included in the audio track, to obtain initial text information; performs disfluency detection on the initial text information by using a disfluency detection means, to obtain text information obtained after disfluency detection; and further performs, by using a natural language processing (NLP) means, text correction on the text information obtained after disfluency detection, to obtain corrected speech information (text), namely, the first text information.

In an implementation, attribute information (namely, the text information corresponding to the image information) of the target object included in the image frame is determined by performing object detection on the image frame by using the object recognition model, to improve accuracy of determining the attribute information of the target object in the target video. Optionally, the extracting corresponding second text information from the image information based on an extraction manner corresponding to the image information is implemented in the following manner:

inputting each image frame in the image information into an object recognition model to obtain attribute information of a target object included in each image frame, and using the attribute information as the second text information.

The attribute information of the target object may be understood as specific information of an object that appears in a single image. An object that appears in an image and a class of the object can be detected by using the object detection model. The object that appears in the image can reflect, to a large degree, information that needs to be transferred in the image, and therefore is used as one dimension of information extraction.

The object recognition model may be understood as an object detection network such as YOLO/Faster-RCNN/SSD, and is used to detect the attribute information such as an object name and/or an object location of the target object included in the image frame, and use the attribute information as the second text information.

Figure 4:
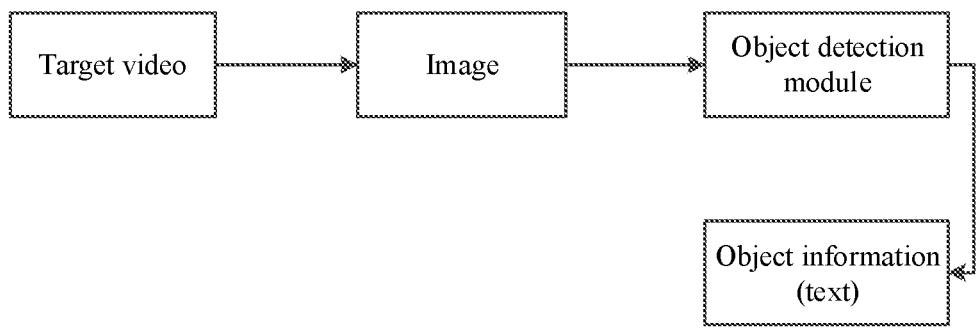
FIG. 4 is a flowchart of extracting text information corresponding to image information included in a video according to an embodiment of this application.

For example, as shown in FIG. 4, the server receives a video (namely, the target video); performs frame extraction on the video to obtain an image frame; and performs, by using an object detection means (namely, an object identification model), object recognition on the image frame obtained through frame extraction, to obtain attribute information of a target object included in the image frame, namely, object information (text), namely, the second text information.

The subtitle information is adjusted by using a language processing model and a text processing model, to improve accuracy of the text information (namely, the third text information) corresponding to the subtitle information. Optionally, the performing text processing on the subtitle information to generate third text information corresponding to the subtitle information is implemented in the following manner:

adjusting the subtitle information based on a language processing model and a text processing model, to obtain the third text information corresponding to the subtitle information.

The language processing model may be understood as a natural language processing (NLP) model, and is used to correct and perform noise reduction on the subtitle information. In addition, an interval between image frames may be very small, and subtitle information included in image frames obtained through adjacent frame extraction may be the same. Therefore, deduplication further needs to be performed on same text content by using the text processing model, to finally obtain text information obtained after deduplication, namely, the third text information.

Figure 5:
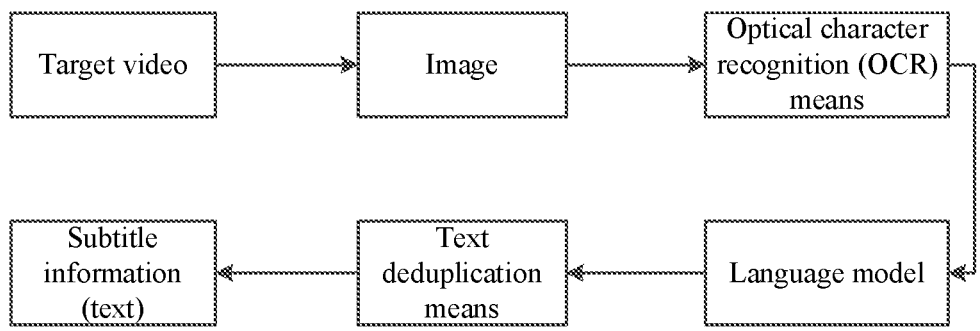
FIG. 5 is a flowchart of extracting text information corresponding to subtitle information included in a video according to an embodiment of this application.

For example, as shown in FIG. 5, the server receives a video (namely, the target video); performs frame extraction on the video to obtain an image frame; inputs, into an optical character recognition (OCR) model for text recognition, the image frame obtained through frame extraction, to obtain subtitle information included in the image frame; performs text correction on the subtitle information by using a language model to obtain corrected text information; and performs deduplication on the corrected text information by using a text deduplication means, to obtain subtitle information (text) obtained after deduplication, namely, the third text information.

Step 206: Perform matching between preset object information of a target object and the text information to determine an object list corresponding to the target object included in the target video.

Optionally, the target object includes a commodity, a character, an animal, a virtual article, a regulation, and the like. Correspondingly, the object information includes commodity information, character information, animal information, virtual article information, sensitive word information, and the like. The object list includes a commodity list, a character list, an animal list, a virtual article list, a sensitive word list, and the like.

The commodity list may be represented as a commodity name list, a commodity brand list, a commodity category list, or a commodity brand-commodity category-commodity name list including a commodity name, a commodity category, and a commodity brand. Details are not described herein.

The performing matching between preset object information of a target object and the text information may be understood as searching the text information for the preset object information to determine whether the target video includes corresponding object information, form an object list by using the object information included in the target video, and indicate, by using the object list, that the target video includes the target object.

According to some embodiments of the present application, the text information is extracted from multi-modal information of the target video, and the target object included in the target video and the object list corresponding to the target object are determined through information matching. This improves accuracy of determining the target object in the target video and the object list corresponding to the target object, to help quickly understand the target object included in the target video, and perform task processing such as searching, recommendation, video summarization, and reviewing on the target video based on the object information.

In some embodiments, the performing matching between preset object information of a target object and the text information to determine an object list corresponding to the target object included in the target video is implemented in the following manner:

performing retrieval in the text information based on first sub-information in the preset object information of the target object to determine target first sub-information included in the text information;

performing, based on second sub-information in the object information, retrieval in text information in a preset retrieval range corresponding to the target first sub-information, to determine target second sub-information corresponding to the target first sub-information; and determining, based on the target first sub-information and the target second sub-information, the object list corresponding to the target object included in the target video.

The first sub-information may be understood as name information such as a commodity name, a character name, and an animal name. Retrieval may be performed in the text information based on the first sub-information, so that specific first sub-information included in the text information can be determined, to use the first sub-information included in the text information as the target first sub-information.

The second sub-information may be understood as information such as a commodity brand, a character complexion, and an animal color. The preset retrieval range is a preset range of performing searching in context at a text location of the target first sub-information. The preset retrieval range may be represented as a range of a quantity of words or sentences forward or backward the text location, for example, 20 words forward or backward, or two sentences forward or backward.

For example, the text information is "朋友们大家好 上周在A1 官方旗舰店 买了双运动鞋 (Chinese characters, which mean "Hi, friends, I bought a pair of sneakers at A1 official flagship store last week"). The target first sub-information is "运动鞋 (Chinese characters, which mean "sneakers"), and the second sub-information is A1. It is assumed that a context threshold (namely, the preset retrieval range) is set to 20, that is, searching is performed in a range of a maximum of 20 words forward, and searching is performed in a range of a maximum of 20 words backward. Therefore, when A1 is retrieved, "运动鞋 (Chinese characters, which mean "sneakers") can be successfully obtained through matching.

The performing retrieval in text information in a preset retrieval range corresponding to the target first sub-information means retrieving the second sub-information near context of a location at which the first sub-information appears in the text information, using the retrieved second sub-information as the target second sub-information corresponding to the target first sub-information, and further determining, based on the target first sub-information and the target second sub-information corresponding to the target first sub-information, the object list of the target object included in the target video, namely, a summary information list of the target object included in the target video.

In addition, when no second sub-information is detected in the text information in the preset retrieval range corresponding to the target first sub-information, the retrieved target first sub-information is not processed, that is, the foregoing retrieval result obtained by using the first sub-information is discarded.

In the embodiments of this application, the target first sub-information and the target second sub-information that match the first sub-information and the second sub-information in the object information are explicitly searched, and the object list of the target object included in the target video is further determined based on the target first sub-information and the target second sub-information, so that the target object included in the target video is determined based on a plurality of pieces of information, and the object list of the target object is formed. Therefore, accuracy of determining the target object is improved, and the target object included in the target video is described by using the object list, to effectively extract information about the target object included in the target video.

Optionally, the performing, based on second sub-information in the object information, retrieval in text information in a preset retrieval range corresponding to the target first sub-information, to determine target second sub-information corresponding to the target first sub-information includes:

performing, based on the second sub-information in the object information, retrieval in the text information in the preset retrieval range corresponding to the target first sub-information;

when retrieving a plurality of pieces of third sub-information that match the second sub-information, determining a distance between each piece of third sub-information and the target first sub-information in the text information; and determining, based on the distance, the target second sub-information corresponding to the target first sub-information.

The distance may be understood as a quantity of words between two pieces of information. Third sub-information closer to the target first sub-information is used as the target second sub-information, to increase accuracy of determining the target second sub-information corresponding to the target first sub-information.

An example in which the target object is a commodity is used. The target first sub-information is a commodity name: 运动鞋(Chinese characters, which mean "sneakers"). Two commodity brands (second sub-information) A1 and A2 are retrieved in context information (in a range of 20 words forward or backward) in which "运动鞋 (Chinese characters, which mean "sneakers") is located, where a distance between A1 and "运动鞋 (Chinese characters, which mean "sneakers") is 2 words, and a distance between A2 and "运动鞋 (Chinese characters, which mean "sneakers") is 10 words. In this case, A1 is determined as a commodity brand corresponding to "运动鞋 (Chinese characters, which mean "sneakers").

Optionally, in addition to the foregoing manner of determining the target second sub-information, after the plurality of pieces of third sub-information that match the second sub-information are retrieved, the method further includes:

determining a quantity of times of matching each type of third sub-information; and determining, based on the quantity of times of matching, target second sub-information corresponding to the target first sub-information.

The quantity of times of matching may be understood as a quantity of times of retrieving same type of third sub-information. For example, a voting manner may be used. When five pieces of third sub-information that match the second sub-information are retrieved, where three pieces of third sub-information are A1 (that is, a quantity of times of matching A1 is three), and two pieces of third sub-information are A2 (that is, a quantity of times of matching A2 is two), the third sub-information A1 with a larger quantity of times of matching is used as the target second sub-information, to increase accuracy of determining the target second sub-information corresponding to the first sub-information.

Optionally, the determining, based on the target first sub-information and the target second sub-information, the object list corresponding to the target video includes:

determining, based on a mapping relationship between the target first sub-information and the target second sub-information in a preset information mapping table, the object list corresponding to the target object included in the target video.

In actual application, the preset information mapping table may be understood as an information mapping table including the first sub-information and the second sub-information. In addition, the preset information mapping table further includes other object information. In an implementation, the preset information mapping table may be provided by a third party, or the preset information mapping table may be obtained by capturing data (including the first sub-information and the second sub-information) in a network and then manually cleaning and annotating the data.

On the basis of determining the target first sub-information and the target second sub-information, one mapping relationship record (namely, an object entry forming the object list) may be uniquely determined, and the object list is further formed by using a plurality of determined mapping relationship records, so that the target object included in the target video can be quickly understood by using the object list. In addition, information included in the object list is further used to retrieve the target object included in the target video, to filter out unimportant information in the target video, and improve retrieval efficiency.

Optionally, after the determining the target second sub-information corresponding to the target first sub-information, the method further includes:

marking information between the target first sub-information and the target second sub-information in the text information, and determining unmarked text information;

performing retrieval in the unmarked text information based on the second sub-information to determine target second sub-information included in the unmarked text information;

determining a preset processing range corresponding to the target second sub-information included in the unmarked text information;

performing word segmentation processing on unmarked text information in the preset processing range, and converting, into a first word vector, a word obtained through word segmentation processing; and performing similarity comparison between the first word vector and a second word vector obtained through conversion by using the first sub-information, to determine target first sub-information corresponding to the target second sub-information comprised in the unmarked text information.

The marking information between the target first sub-information and the target second sub-information in the text information, and determining unmarked text information may be understood as marking (to skip subsequent matching) a part (namely, processed information and context) in which the object information is matched in the text information, to determine text information in which no object information is matched, and perform information matching again on the text information in which no object information is matched, so as to improve a quantity of information in which the object information is matched in the text information, and further increase comprehensiveness and accuracy of the object information included in the object list.

The foregoing example is still used. The text information is "朋友们大家好 上周在A1 官方旗舰店买了双运动鞋 (Chinese characters, which mean "Hi, friends, I bought a pair of sneakers at A1 official flagship store last week"), where the target first sub-information is " 运动鞋 (Chinese characters, which mean "sneakers"), the target second sub-information is A1, and text between A1 and " 运动鞋 (Chinese characters, which mean "sneakers") in the text information is marked. In this case, the unmarked text information is " 朋友们大家好 上周在 (Chinese characters, which mean "Hi, friends, . . . last week").

The second sub-information is retrieved in the unmarked text information, so that the target second sub-information included in the unmarked text information is determined. A reason is that retrieval is already performed in the entire text information based on the first sub-information, and the unmarked text information may be understood as text information in which no first sub-information is retrieved. Therefore, when retrieval is performed again, retrieval is performed based on the second sub-information, so that the target second sub-information included in the unmarked text information is determined. A reason is that after the first sub-information is scanned, first sub-information that is not displayed may exist in the text information. Therefore, the first sub-information that is not displayed is retrieved again.

Further, the performing word segmentation processing on unmarked text information in the preset processing range of the target second sub-information may be understood as performing sentence segmentation on the unmarked text information in the preset processing range to obtain a sentence included in the preset processing range, performing word segmentation on the sentence to obtain a phrase (namely, a word) that forms the sentence, and converting the word into the first word vector (that is, word embedding or word vector embedding). It may be understood that feature extraction is performed on the word by using a conversion model such as BERT/Text CNN, to convert the word into vector code. The preset processing range is similar to the foregoing preset retrieval range. Details are not described herein again. The first sub-information in the preset object information is also converted into the second word vector. An implementation of converting the first sub-information into the second word vector is similar to the implementation of converting the word into the first word vector, and details are not described herein again.

Further, similarity comparison is performed between the first word vector and the second word vector (because the first sub-information is not displayed, the first sub-information is not labeled, that is, marked, and a similarity corresponding to the word vector is extracted). If a similarity comparison result is greater than a similarity threshold, it indicates that the first word vector is similar to the second word vector, that is, the first sub-information is similar to the word in the unmarked text information. In this case, the word in the unmarked text information is used as the target first sub-information. If a similarity comparison result is less than or equal to a similarity threshold, it indicates that the first word vector is not similar to the second word vector, that is, the first sub-information is different from the word in the unmarked text information, and no processing is performed.

Optionally, in the video processing method, after the object list corresponding to the target object included in the target video is determined, the method further includes:

receiving a query instruction for the target object;

performing matching between object information in the object list and object information that is of the target object and that is carried in the query instruction; and when the matching succeeds, displaying the target video and the object list as a query result corresponding to the query instruction.

In actual application, after video processing is performed on the target object to obtain the object list of the target object included in the target video, query may be performed by using a keyword (object information). When the object list obtained through query includes a query keyword, the target video corresponding to the object list is displayed, that is, whether the target video includes the target object is quickly determined through object information matching, to display the target video. This improves query efficiency of the target video including the target object.

In actual application, on the basis of displaying the target video as the query result, the object list may be further displayed, to help a query user quickly understand the target object included in the target video.

In conclusion, the video processing method provided in this application includes: extracting the at least two types of modal information from the received target video; extracting the text information from the at least two types of modal information based on the extraction manners corresponding to the at least two types of modal information; and performing matching between the preset object information of the target object and the text information to determine the object list corresponding to the target object included in the target video. Therefore, the text information is extracted from multi-modal information of the target video, and the target object included in the target video and the object list corresponding to the target object are determined through information matching. This improves accuracy of determining the target object in the target video and the object list corresponding to the target object, to help quickly understand the target object included in the target video, and perform task processing such as searching, recommendation, video summarization, and reviewing on the target video based on the object information.

Figure 6:
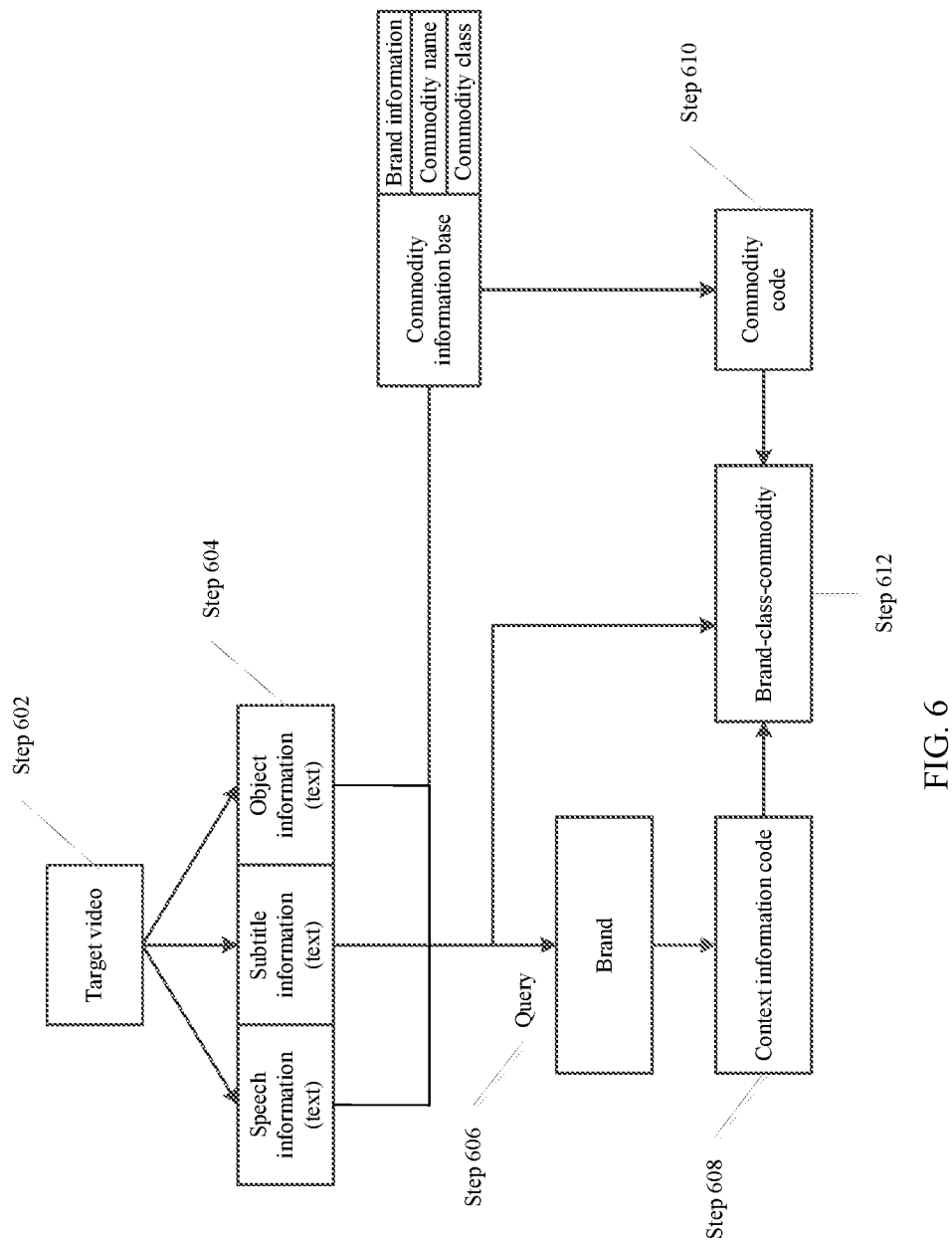
FIG. 6 is a processing flowchart of a video processing method applied to a commodity video scenario according to an embodiment of this application.

With reference to FIG. 6, the following further describes the video processing method by using an example in which the video processing method provided in this application is applied to a commodity video scenario. FIG. 6 is a processing flowchart of a video processing method applied to a commodity video scenario according to an embodiment of this application. The method includes the following steps.

Step 602: Receive a commodity video (namely, a target video) that includes a target commodity.

Step 604: Extract speech information (text), subtitle information (text), and object information (text) from the commodity video, and form text information by using the extracted speech information (text), subtitle information (text), and object information (text).

The object information is commodity information such as a commodity name of the target commodity included in the commodity video.

Step 606: Perform query in the text information based on brand information in a commodity information base, to determine a brand included in the text information.

Step 608: Perform word segmentation processing on text information in a context range in which the brand is located, to obtain a word obtained after word segmentation processing, and convert the word into a first word vector (that is, context information code).

Step 610: Convert a commodity name in the commodity information base into a second word vector (that is, commodity code).

It should be noted that step 608 and step 610 may be interchanged in an execution sequence.

Step 612: Perform similarity comparison between the first word vector and the second word vector to determine a commodity corresponding to the brand included in the text information, and determine, based on the brand and the commodity, a category to which the commodity belongs, to obtain a brand-category-commodity list (namely, a commodity list of the commodity included in the commodity video).

In actual application, recommending a corresponding commodity based on video content is one application manner of video information extraction. Currently, video commodity recommendation mainly relies on manual marking, that is, manually reviewing a commodity that appears in a video, or relies on extraction of a single information source, that is, extraction of information in a dimension from a video to obtain a commodity name that appears in the video. In the first manner, labor costs are high and efficiency is low. In the second manner, a fault tolerance rate is low, and missing and mistaken determining are easy to occur. Therefore, how to accurately extract and mine commodity information from a large quantity of videos becomes an application problem that needs to be resolved in video recommendation.

In conclusion, the video processing method provided in this application includes: extracting three types of modal information from a received commodity video; extracting text information from the three types of modal information based on extraction manners corresponding to the three types of modal information; and performing matching between preset commodity information of a target commodity and the text information to determine a commodity list corresponding to the target commodity included in the commodity video. Therefore, the text information is extracted from multi-modal information of the commodity video, and the target commodity included in the commodity video and the commodity list corresponding to the target commodity are determined through information matching. This improves accuracy of determining the target commodity in the commodity video and the commodity list corresponding to the target commodity, to help quickly understand the target commodity included in the commodity video, and perform task processing such as searching, recommendation, video summarization, and reviewing on the commodity video based on the commodity information.

Figure 7:
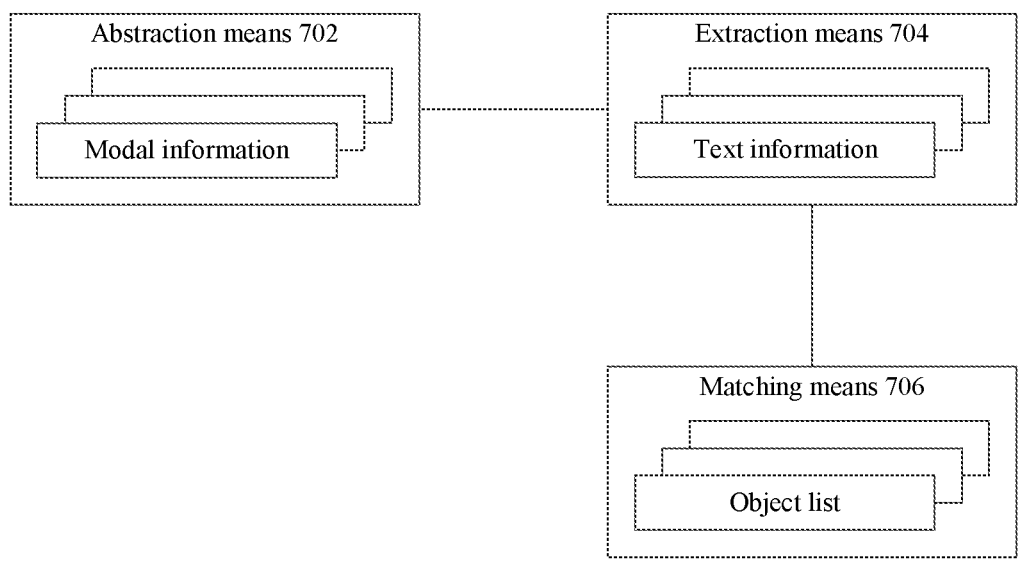
FIG. 7 is a schematic diagram of a structure of a video processing apparatus according to an embodiment of this application.

Corresponding to the method embodiments, this application further provides an embodiment of a video processing apparatus. FIG. 7 is a schematic diagram of a structure of a video processing apparatus according to an embodiment of this application. As shown in FIG. 7, the apparatus includes:

an abstraction means 702, configured to extract at least two types of modal information from a received target video;

an extraction means 704, configured to extract text information from the at least two types of modal information based on extraction manners corresponding to the at least two types of modal information; and a matching means 706, configured to perform matching between preset object information of a target object and the text information to determine an object list corresponding to the target object included in the target video.

Optionally, the matching means 706 includes:

a first determining sub-means, configured to perform retrieval in the text information based on first sub-information in the preset object information of the target object to determine target first sub-information included in the text information;

a second determining sub-means, configured to perform, based on second sub-information in the object information, retrieval in text information in a preset retrieval range corresponding to the target first sub-information, to determine target second sub-information corresponding to the target first sub-information; and a list determining sub-means, configured to determine, based on the target first sub-information and the target second sub-information, the object list corresponding to the target object included in the target video.

Optionally, the second determining sub-means is further configured to:

perform, based on the second sub-information in the object information, retrieval in the text information in the preset retrieval range corresponding to the target first sub-information;

when retrieving a plurality of pieces of third sub-information that match the second sub-information, determine a distance between each piece of third sub-information and the target first sub-information in the text information; and determine, based on the distance, the target second sub-information corresponding to the target first sub-information.

Optionally, the second determining sub-means is further configured to:

determine a quantity of times of matching each type of third sub-information; and determine, based on the quantity of times of matching, target second sub-information corresponding to the target first sub-information.

Optionally, the list determining sub-means is configured to:

determine, based on a mapping relationship between the target first sub-information and the target second sub-information in a preset information mapping table, the object list corresponding to the target object included in the target video.

Optionally, the matching means 706 is further configured to:

mark information between the target first sub-information and the target second sub-information in the text information, and determine unmarked text information;

perform retrieval in the unmarked text information based on the second sub-information to determine target second sub-information included in the unmarked text information;

determine a preset processing range corresponding to the target second sub-information included in the unmarked text information;

perform word segmentation processing on unmarked text information in the preset processing range, and convert, into a first word vector, a word obtained through word segmentation processing; and perform similarity comparison between the first word vector and a second word vector obtained through conversion by using the first sub-information, to determine target first sub-information corresponding to the target second sub-information included in the unmarked text information.

Optionally, the abstraction means 702 is further configured to:

extract speech information from the received target video;

extract image information from the target video based on a preset extraction rule; and/or extract image information from the target video based on a preset extraction rule, and extract subtitle information included in the image information.

Optionally, the extraction means 704 includes:

a first extraction sub-means, configured to extract corresponding first text information from the speech information based on an extraction manner corresponding to the speech information;

a second extraction sub-means, configured to extract corresponding second text information from the image information based on an extraction manner corresponding to the image information; and/or a generation sub-means, configured to perform text processing on the subtitle information to generate third text information corresponding to the subtitle information, where the first text information, the second text information, and/or the third text information form/forms the text information.

Optionally, the first extraction sub-means is further configured to:

perform speech recognition by inputting the speech information into a speech recognition model, to obtain initial text information included in the speech information; and adjust the initial text information based on a disfluency detection model and a text correction model, to obtain the first text information corresponding to the speech information.

Optionally, the second extraction sub-means is further configured to:

input each image frame in the image information into an object recognition model to obtain attribute information of a target object included in each image frame, and use the attribute information as the second text information.

Optionally, the generation sub-means is further configured to:

adjust the subtitle information based on a language processing model and a text processing model, to obtain the third text information corresponding to the subtitle information.

Optionally, the video processing apparatus further includes:

an instruction receiving means, configured to receive a query instruction for the target object;

an information matching means, configured to perform matching between object information in the object list and object information that is of the target object and that is carried in the query instruction; and a display means, configured to: when the matching succeeds, display the target video and the object list as a query result corresponding to the query instruction.

In conclusion, the video processing apparatus provided in this application extracts the at least two types of modal information from the received target video; extracts the text information from the at least two types of modal information based on the extraction manners corresponding to the at least two types of modal information; and performs matching between the preset object information of the target object and the text information to determine the object list corresponding to the target object included in the target video. Therefore, the text information is extracted from multimodal information of the target video, and the target object included in the target video and the object list corresponding to the target object are determined through information matching. This improves accuracy of determining the target object in the target video and the object list corresponding to the target object, to help quickly understand the target object included in the target video, and perform task processing such as searching, recommendation, video summarization, and reviewing on the target video based on the object information.

The foregoing describes the schematic solution of the video processing apparatus in this embodiment. It should be noted that the technical solution of the video processing apparatus and the technical solution of the video processing method belong to the same concept. For detailed content not described in detail in the technical solution of the video processing apparatus, refer to the descriptions of the technical solution of the video processing method.

Figure 8:
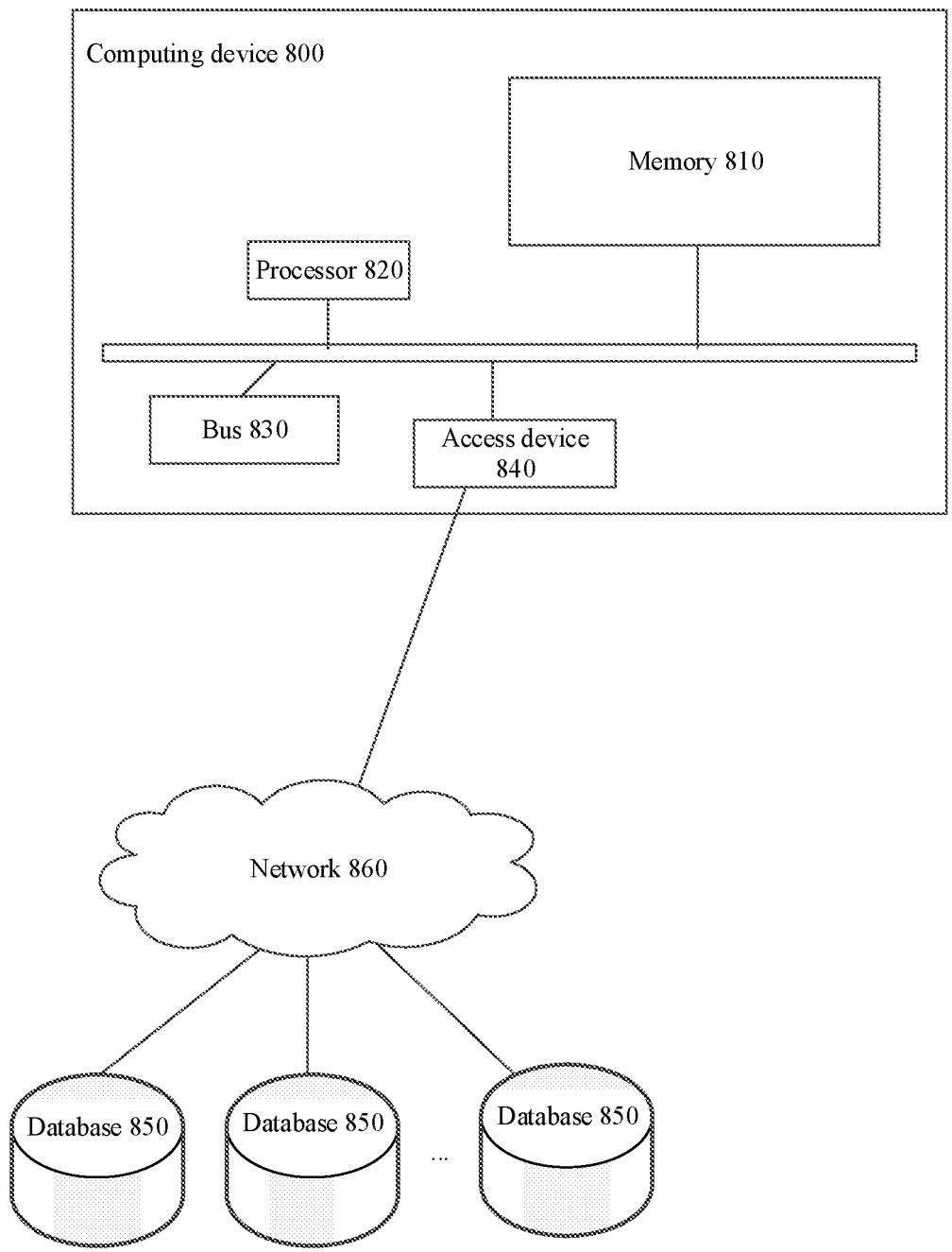
FIG. 8 is a block diagram of a structure of a computing device according to an embodiment of this application.

FIG. 8 is a block diagram of a structure of a computing device 800 according to an embodiment of this application. Components of the computing device 800 include but are not limited to a memory 810 and a processor 820. The processor 820 and the memory 810 are connected by using a bus 830, and a database 850 is configured to store data.

The computing device 800 further includes an access device 840, and the access device 840 enables the computing device 800 to perform communication by using one or more networks 860. Examples of these networks include a public switched telephone network (PSTN), a local area network (LAN), a wide area network (WAN), a private area network (PAN), or a combination of communication networks such as the Internet. The access device 840 may include one or more of any type of wired or wireless network interface (for example, a network interface card (NIC)), for example, an IEEE 802.11 wireless local area network (WLAN) wireless interface, a worldwide interoperability for microwave access (WiMAX) interface, an Ethernet interface, a universal serial bus (USB) interface, a cellular network interface, a Bluetooth interface, and a near field communication (NFC) interface.

In an embodiment of this application, the foregoing components of the computing device 800 and other components not shown in FIG. 8 may be alternatively connected to each other, for example, by using the bus. It should be understood that the block diagram of the structure of the computing device shown in FIG. 8 is merely used as an example instead of a limitation on the scope of this application. A person skilled in the art may add or substitute other components as required.

The computing device 800 may be any type of still or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smart watch or smart glasses), another type of mobile device, or a still computing device such as a desktop computer or a PC. The computing device 800 may be a mobile or still server.

The processor 820 implements steps of the video processing method when executing computer instructions.

The foregoing describes the schematic solution of the computing device in this embodiment. It should be noted that the technical solution of the computing device and the technical solution of the video processing method belong to the same concept. For detailed content not described in detail in the technical solution of the computing device, refer to the descriptions of the technical solution of the video processing method.

An embodiment of this application further provides a computer-readable storage medium, where the computer-readable storage medium stores computer instructions, and when the instructions are executed by a processor, steps of the video processing method are implemented.

The foregoing describes the schematic solution of the computer-readable storage medium in this embodiment. It should be noted that the technical solution of the storage medium and the technical solution of the video processing method belong to the same concept. For detailed content not described in detail in the technical solution of the storage medium, refer to the descriptions of the technical solution of the video processing method.

An embodiment of this application further provides a computer program product, where when the computer program product is executed in a computer, the computer is enabled to perform steps of the video processing method.

The foregoing describes the schematic solution of the computer program product in this embodiment. It should be noted that the technical solution of the computer program product and the technical solution of the video processing method belong to the same concept. For detailed content not described in detail in the technical solution of the computer program product, refer to the descriptions of the technical solution of the video processing method.

Specific embodiments of this application are described above. Other embodiments fall within the scope of the appended claims. In some cases, the actions or steps recorded in the claims can be performed in an order different from the order in the embodiments and the desired results can still be achieved. In addition, the process depicted in the accompanying drawings does not necessarily require the shown particular order or consecutive order to achieve the desired results. In some implementations, multi-task processing and parallel processing can or may be advantageous.

The computer instructions include computer program product code. The computer program product code may be in a source code form, an object code form, an executable file form, some intermediate forms, or the like. The computer-readable medium may include any entity or apparatus, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, and the like that can carry the computer program product code. It should be noted that content included in the computer-readable medium may be appropriately added or deleted according to the demands of legislation and patent practice in a jurisdiction, for example, in some jurisdictions, according to legislation and patent practice, the computer-readable medium includes neither an electrical carrier signal nor a telecommunications signal.

It should be noted that, for ease of description, the foregoing method embodiments are described as a combination of a series of actions. However, a person skilled in the art should understand that this application is not limited to the described action sequence, because according to this application, some steps may be performed in another order or simultaneously. In addition, a person skilled in the art should also understand that the described embodiments in this application are all preferred embodiments, and the used actions and modules are not necessarily mandatory to this application.

In the foregoing embodiments, descriptions of the embodiments have respective focuses. For a part that is not described in detail in an embodiment, refer to related descriptions in another embodiment.

The preferred embodiments of this application disclosed above are merely intended to help describe this application. In the optional embodiments, all details are not described in detail, and the present application is not limited to the specific implementations. Clearly, many modifications and changes may be made based on the content of this application. These embodiments are selected and specifically described in this application to better explain the principle and the actual application of this application, so that a person skilled in the art can better understand and use this application. This application is only subjected to the claims and the scope and equivalents thereof.

What is claimed is:

1. A method, comprising:
   extracting at least two types of modal information from a received target video;
   extracting text information from the at least two types of modal information based on extraction manners corresponding to the at least two types of modal information, wherein the text information includes at least two sub-information; and
   performing matching between preset object information of a target object and the text information to determine an object list corresponding to the target object comprised in the target video, comprising:
      performing retrieval in the text information based on first sub-information in the preset object information of the target object to determine target first sub-information comprised in the text information;
      performing, based on second sub-information in the object information, retrieval in text information in a preset retrieval range corresponding to the target first sub-information, to determine target second sub-information corresponding to the target first sub-information; and
      determining, based on the target first sub-information and the target second sub-information, the object list corresponding to the target object comprised in the target video.

2. The method according to claim 1, wherein the performing, based on second sub-information in the object information, retrieval in text information in a preset retrieval range corresponding to the target first sub-information, to determine target second sub-information corresponding to the target first sub-information comprises:
   performing, based on the second sub-information in the object information, retrieval in the text information in the preset retrieval range corresponding to the target first sub-information;
   when retrieving a plurality of pieces of third sub-information that match the second sub-information, determining a distance between each piece of third sub-information and the target first sub-information in the text information; and
   determining, based on the distance, the target second sub-information corresponding to the target first sub-information.

3. The method according to claim 2, after the retrieving a plurality of pieces of third sub-information that match the second sub-information, further comprising:
   determining a quantity of times of matching each type of third sub-information; and
   determining, based on the quantity of times of matching, target second sub-information corresponding to the target first sub-information.

4. The method according to claim 1, wherein the determining, based on the target first sub-information and the target second sub-information, the object list corresponding to the target video comprises:
   determining, based on a mapping relationship between the target first sub-information and the target second sub-information in a preset information mapping table, the object list corresponding to the target object comprised in the target video.

5. The method according to claim 1, after the determining target second sub-information corresponding to the target first sub-information, further comprising:
   marking information between the target first sub-information and the target second sub-information in the text information, and determining unmarked text information;
   performing retrieval in the unmarked text information based on the second sub-information to determine target second sub-information comprised in the unmarked text information;
   determining a preset processing range corresponding to the target second sub-information comprised in the unmarked text information;
   performing word segmentation processing on unmarked text information in the preset processing range, and converting, into a first word vector, a word obtained through word segmentation processing; and
   performing similarity comparison between the first word vector and a second word vector obtained through conversion by using the first sub-information, to determine target first sub-information corresponding to the target second sub-information comprised in the unmarked text information.

6. The method according to claim 1, wherein the extracting at least two types of modal information from a received target video comprises:
   extracting speech information from the received target video;
   extracting image information from the target video based on a preset extraction rule; and/or
   extracting image information from the target video based on a preset extraction rule, and extracting subtitle information comprised in the image information.

7. The method according to claim 6, wherein the extracting text information from the at least two types of modal information based on extraction manners corresponding to the at least two types of modal information comprises:
   extracting corresponding first text information from the speech information based on an extraction manner corresponding to the speech information;
   extracting corresponding second text information from the image information based on an extraction manner corresponding to the image information; and/or
   performing text processing on the subtitle information to generate third text information corresponding to the subtitle information, wherein
   the first text information, the second text information, and/or the third text information form/forms the text information.

8. The method according to claim 7, wherein the extracting corresponding first text information from the speech information based on an extraction manner corresponding to the speech information comprises:
performing speech recognition by inputting the speech information into a speech recognition model, to obtain initial text information comprised in the speech information; and
adjusting the initial text information based on a disfluency detection model and a text correction model, to obtain the first text information corresponding to the speech information.

9. The method according to claim 7, wherein the extracting corresponding second text information from the image information based on an extraction manner corresponding to the image information comprises:
inputting each image frame in the image information into an object recognition model to obtain attribute information of a target object comprised in each image frame, and using the attribute information as the second text information.

10. The method according to claim 7, wherein the performing text processing on the subtitle information to generate third text information corresponding to the subtitle information comprises:
adjusting the subtitle information based on a language processing model and a text processing model, to obtain the third text information corresponding to the subtitle information.

11. The method according to claim 1, further comprising:
receiving a query instruction for the target object;
performing matching between object information in the object list and object information that is of the target object and that is carried in the query instruction; and
when the matching succeeds, displaying the target video and the object list as a query result corresponding to the query instruction.

12. A computing device, comprising a memory, a processor, and computer instructions stored in the memory and capable of running on the processor, wherein when executing the instructions, the processor performs operations comprising:
extracting at least two types of modal information from a received target video;
extracting text information from the at least two types of modal information based on extraction manners corresponding to the at least two types of modal information, wherein the text information includes at least two sub-information; and
performing matching between preset object information of a target object and the text information to determine an object list corresponding to the target object comprised in the target video, comprising:
performing retrieval in the text information based on first sub-information in the preset object information of the target object to determine target first sub-information comprised in the text information;
performing, based on second sub-information in the object information, retrieval in text information in a preset retrieval range corresponding to the target first sub- information, to determine target second sub-information corresponding to the target first sub-information; and
determining, based on the target first sub-information and the target second sub- information, the object list corresponding to the target object comprised in the target video.

13. The computing device according to claim 12, wherein the performing, based on second sub-information in the object information, retrieval in text information in a preset retrieval range corresponding to the target first sub-information, to determine target second sub-information corresponding to the target first sub-information comprises:
performing, based on the second sub-information in the object information, retrieval in the text information in the preset retrieval range corresponding to the target first sub-information;
when retrieving a plurality of pieces of third sub-information that match the second sub-information, determining a distance between each piece of third sub-information and the target first sub-information in the text information; and
determining, based on the distance, the target second sub-information corresponding to the target first sub-information.

14. The computing device according to claim 13, wherein the operations further comprise:
after the retrieving a plurality of pieces of third sub-information that match the second sub-information, determining a quantity of times of matching each type of third sub-information; and
determining, based on the quantity of times of matching, target second sub-information corresponding to the target first sub-information.

15. The computing device according to claim 12, wherein the determining, based on the target first sub-information and the target second sub-information, the object list corresponding to the target video comprises:
determining, based on a mapping relationship between the target first sub-information and the target second sub-information in a preset information mapping table, the object list corresponding to the target object comprised in the target video.

16. The computing device according to claim 12, wherein the operations further comprise:
after the determining target second sub-information corresponding to the target first sub-information, marking information between the target first sub-information and the target second sub-information in the text information, and determining unmarked text information;
performing retrieval in the unmarked text information based on the second sub-information to determine target second sub-information comprised in the unmarked text information;
determining a preset processing range corresponding to the target second sub-information comprised in the unmarked text information;
performing word segmentation processing on unmarked text information in the preset processing range, and converting, into a first word vector, a word obtained through word segmentation processing; and
performing similarity comparison between the first word vector and a second word vector obtained through conversion by using the first sub-information, to determine target first sub-information corresponding to the target second sub-information comprised in the unmarked text information.

17. A non-transitory computer-readable storage medium having computer program instructions stored thereon, wherein the computer program instructions, when executed by a processor, cause the processor to:
extract at least two types of modal information from a received target video;
extract text information from the at least two types of modal information based on extraction manners corresponding to the at least two types of modal information, wherein the text information includes at least two sub-information; and perform matching between preset object information of a target object and the text information to determine an object list corresponding to the target object comprised in the target video, comprising:

performing retrieval in the text information based on first sub-information in the preset object information of the target object to determine target first sub-information comprised in the text information;

performing, based on second sub-information in the object information, retrieval in text information in a preset retrieval range corresponding to the target first sub-information, to determine target second sub-information corresponding to the target first sub-information; and determining, based on the target first sub-information and the target second sub- information, the object list corresponding to the target object comprised in the target video.

\* \* \* \* \*